Figure 1:
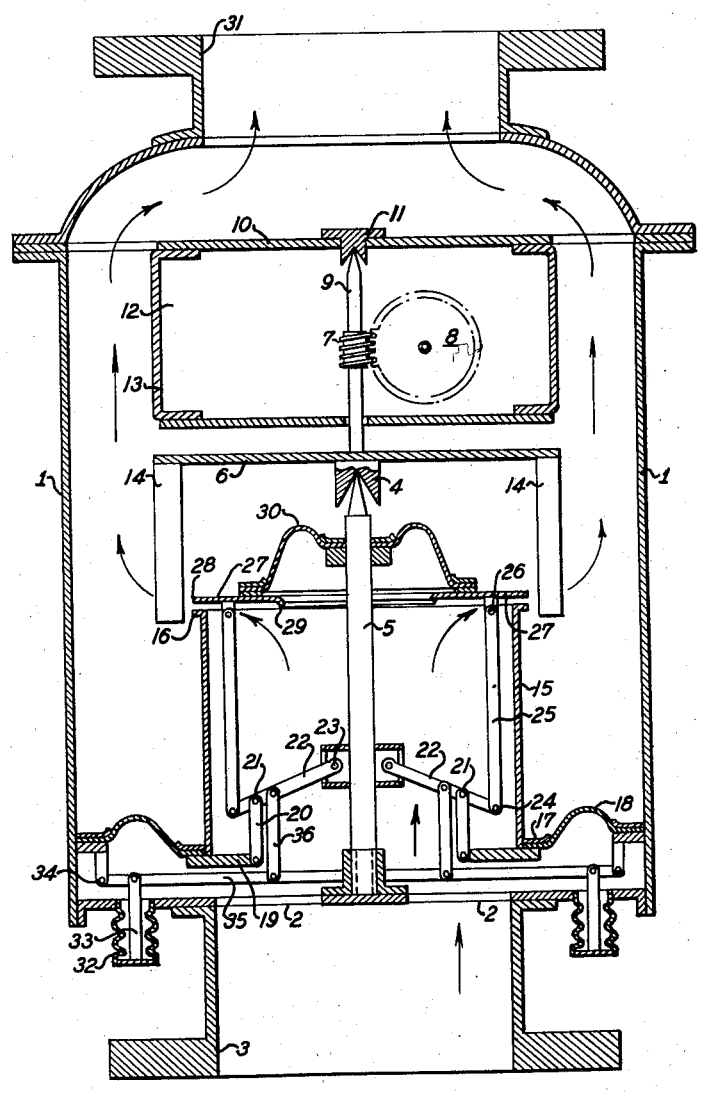

Jan. 27, 1959  H. GEHRE  2,870,634
MEASURING WHEEL METERS
Filed Nov. 24, 1954  4 Sheets-Sheet 1

INVENTOR
HANS GEHRE
BY Burgess Dinklage
ATTORNEYS

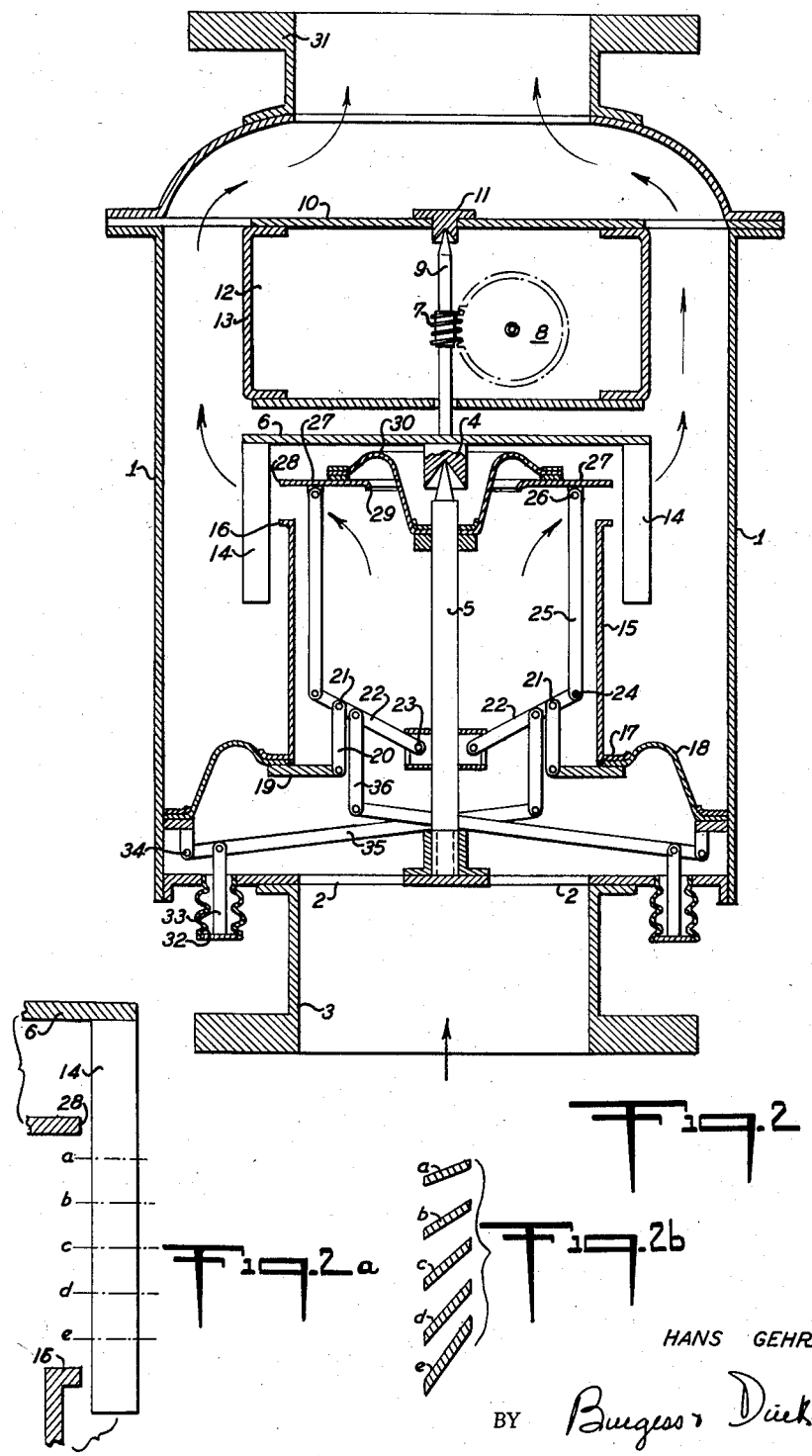

Jan. 27, 1959  H. GEHRE  2,870,634
MEASURING WHEEL METERS
Filed Nov. 24, 1954  4 Sheets-Sheet 3
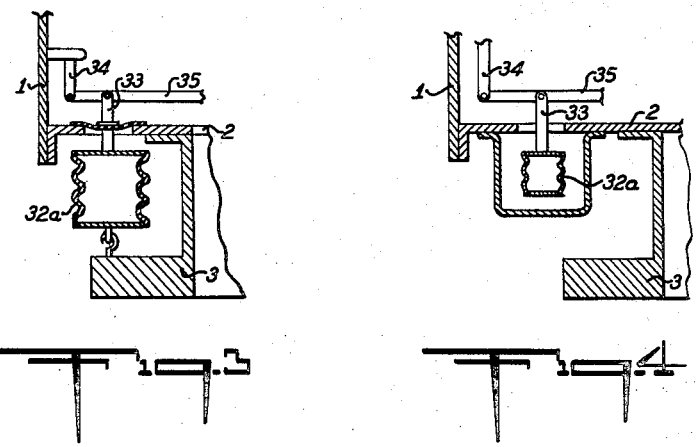
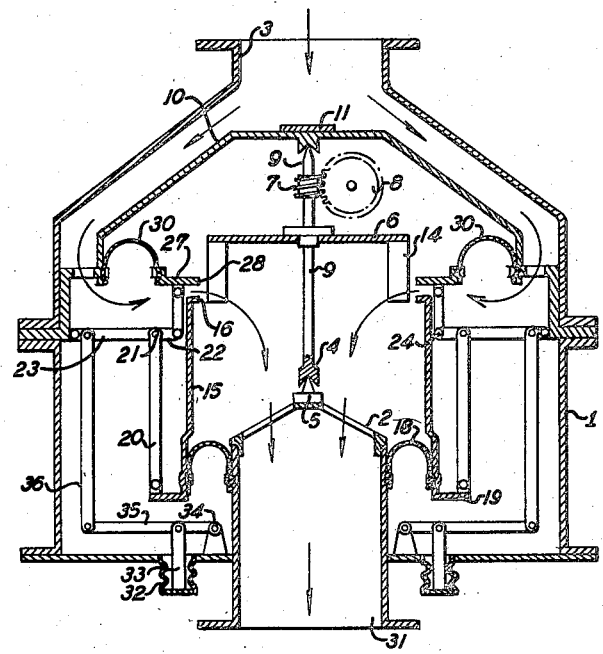
INVENTOR
HANS GEHRE
BY Burgess & Dinklage
ATTORNEYS Jan. 27, 1959     H. GEHRE     2,870,634
MEASURING WHEEL METERS
Filed Nov. 24, 1954     4 Sheets-Sheet 4
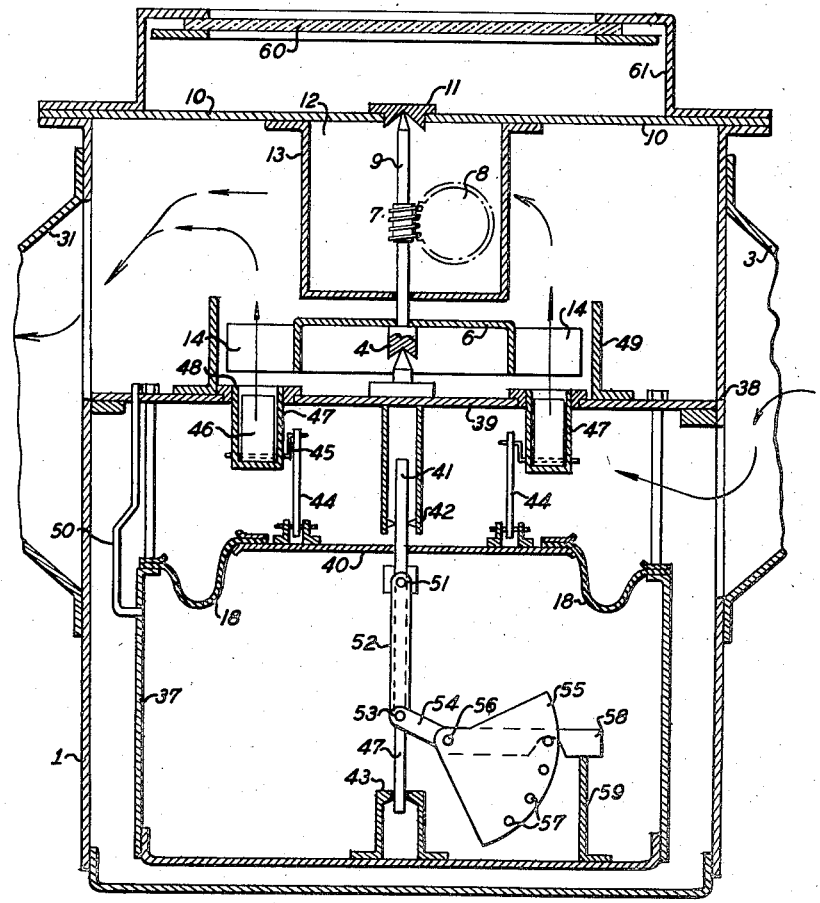
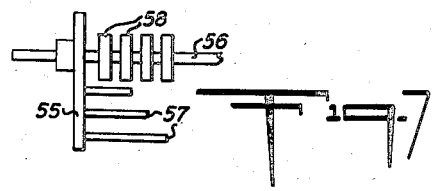
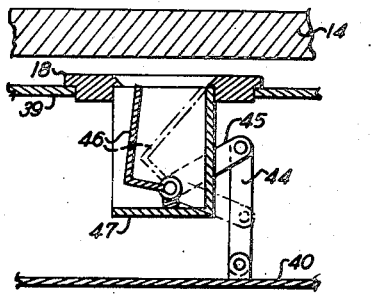
INVENTOR
HANS GEHRE
BY Burgess & Dinklage
ATTORNEYS

United States Patent Office

2,870,634
Patented Jan. 27, 1959

2,870,634

MEASURING WHEEL METERS

Hans Gehre, Oberkassel, Germany

Application November 24, 1954, Serial No. 471,032

Claims priority, application Germany December 14, 1953

16 Claims. (Cl. 73—230)

This invention relates to improvements in measuring wheel meters having a rotatable impulse-type measuring wheel, such as paddle wheel meters, propeller wheel meters, turbine wheel meters, etc. The invention more particularly relates to improvements in measuring wheel meters suitable for measuring gaseous media flowing through pipe lines, in which the angle which the flow of measuring medium forms with the wheel blades and also the size of the orifice forming the measuring cross-section in which the wheel blades move, are automatically controlled in dependence upon the rate of flow, in order to obtain in this way the proportionality or some other desired relationship between the rate of flow and the number of revolutions of the measuring wheel.

A meter construction for this purpose has already been disclosed, U. S. Patent No. 2,749,752, in which, in using a measuring wheel axially movable in dependence upon the rate of flow, the blades which are arranged parallel to the axis of the wheel are helical about their longitudinal middle lines.

It has now been found that with meters of this known construction certain deviations from the theoretical indication occur, deviations caused by a distortion of the velocity diagram which is set up in the orifice representing the measuring cross-section with greater mutual spacing of the rim profiles thereof.

There also arises with these known meters when in use the risk that, with surges or pulsations occurring in the gas throughput, damping of the extremely readily reacting measuring wheel is not sufficient, so that it undergoes jerky axial movements which can readily lead to its damage. Neither a large dimension air damper nor a liquid damper can be used in order to avoid these inconvenient movements, since the effective braking of the measuring wheel so caused would lead to indication errors.

One object of this invention is to avoid the abovementioned disadvantages. This, and still further objects, will become apparent from the following description read in conjunction with the drawings, in which:

Fig. 1 is a vertical section diagrammatically showing an embodiment of a meter in accordance with the invention, Fig. 2 is a vertical section showing the meter of Fig. 1 in a different operating position, Fig. 2a shows an enlarged partial view of the wheel blades 14 and the two rims 16 and 28 of the orifice, Fig. 2b shows in bracket, cross sections of the blade 14 taken at the various section lines a, b, c, d, e shown on Fig. 2a, Fig. 3 shows a diagrammatic vertical section of the control member portion of the meter construction in accordance with the invention, Fig. 4 shows a vertical section diagrammatically illustrating a further control member construction in detail in accordance with the invention, Fig. 5 is a vertical section diagrammatically showing a different embodiment of a meter in accordance with the invention, Fig. 6 is a section showing in detail a portion of the structure of the meter shown in Fig. 5, Fig. 7 is a front elevation of the weighting portion of the device as shown in Fig. 5, Fig. 8 is a vertical section diagrammatically showing a further embodiment of a meter in accordance with the invention.

In accordance with the invention, the meter is provided with a control member (membrane, piston, diving bell or the like) which is subject to the pressure drop at the measuring cross-section and is independent of the measuring wheel, such control member simultaneously controlling the size of the measuring cross-section and also the variability of the angle of incidence of the measured medium against the blades of the measuring wheel.

In a meter of the kind referred to in the prior specification with blades which are twisted about their longitudinal middle lines, this can conveniently be effected by arranging for said control member to serve as the drive of an auxiliary device, which, in dependence upon the rate of flow, simultaneously moves the orifice forming the measuring cross section as a whole along the measuring wheel blades and also alters the mutual spacing of the rims determining the size of this cross-section, whereby the parts which serve as a support for these rims are coupled together by transmission means.

In meters with normally constructed measuring wheels with flat, radially directed blades, the invention can be carried out by arranging for the control member to serve simultaneously as a drive for a guiding device for the stream of measured medium, the guiding members of the device also serving as throttling members for the measuring cross-section and also to serve as the drive for a setting device for effecting a variable loading of the control member.

An embodiment of the invention in connection with the first-mentioned type of meter is illustrated in Figs. 1 and 2 of the drawing in different phases of operation.

In a casing 1 having a lower closure plate which includes an annular opening 2 for connecting an inlet pipe 3, a measuring wheel 6 is carried upon the apex 4 of a column 5. The shaft 9 of the measuring wheel 6 operates a worm drive 7, 8 of the associated counting mechanism and is lodged in a bearing 11 secured to the upper housing plate 10. The space 12, which contains the drive 7, and element 8 of the counting mechanism is enclosed by a cylindrical casing 13. The counting mechanism (not shown) must be assumed to lie outside the housing. It can have any known construction and does not affect the invention.

The measuring wheel 6 has the form of a turbine wheel with a circle of downwardly-directed blades 14 which each has a helical twisting about its longitudinal middle line. An axially movable cylinder 15 is arranged to be co-axial with the shaft 9 and the column 5, its upper edge 16 forming the lower limit of the orifice forming the measuring cross-section and its lower edge 17 being connected in sealing relation to the wall of the housing 1 by means of a readily movable membrane 18.

Inwardly directed supports 19 are provided on the lower edge of the cylinder 15, and, by means of links 20, engage pivot levers 22 at 21, which levers 22 in turn are pivotally connected to the column 5 at 23. The outer ends 24 of these pivot levers 22 are pivotally connected to rods 25, which are connected at 26 to an annular disc 27. The periphery 28 of the disc 27 forms the upper limit or rim of the orifice representing the measuring cross-section. An inner opening 29 in the disc 27 is separated from the inner side of the measuring wheel 6 by a readily movable membrane 30, the center of which is secured in sealing relation to the column 5.

The opposed movabilities of the cylinder 15 and the annular disc 27 are determined accurately by the arrangement of their pivots 21 and 24. Each position of the pivot levers 22 is associated with a certain height of the cylinder 15, i. e., with a definite position of its upper edge 16 with respect to the measuring wheel blades 14. At the same time, however, each position of the pivot levers 22 controls a definite position of the annular disc 27. The distances between the two rims 16 and 28 of the orifice forming the measuring cross-section is determined by the ratio of the distances of the pivot points 21 and 24 from the point 23. An accurate relationship hence exists between the prevailing height of the upper cylinder edge 16 and its distance from the annular disc 27, i. e., from the upper rim 28 of the measuring cross-section.

The gas entering through the pipe 3 and leaving through an outlet pipe 31 undergoes a throttling at the orifice forming the measuring cross-section, i. e., between 16 and 28, resulting in a pressure difference at the two sides of the throttle position. This pressure difference is effective on both membranes 18 and 30 and imparts a vertical drive to the whole system movable with these control membranes. The weight of this system opposes the drive and is so chosen that it compensates it at all rates of flow.

If the rate of flow and hence the pressure drop arising at the measuring cross-section increase, since the vertical drive is also increased, the existing equal-load state between the vertical drive and the weight is destroyed and the whole system which is movable with the membranes is raised until the measuring cross-section attains a size at which the vertical drive caused by the pressure drop is again compensated by the weight of the movable system. In this operation, the measuring orifice moves relative to the blades 14 and the discharging stream of measured medium impinges against the blades in a different region from before.

If the twisting of the blades 14 is so chosen that the alteration of the incidence angle corresponds to the alteration of the rate of flow, the angular velocity of the measuring wheel at each setting of the measuring orifice is proportional to the rate of flow, which is given directly by the following consideration:

The constant weight of the reciprocable system connected with the membranes 18 and 30 necessitates constancy of the pressure drop at the orifice forming the measuring cross-section and hence also constancy of the exit velocity in this cross-section. The movement and variation in size at the measuring orifice is a function of the rate of flow. If the tangent of the angle of incidence in the existing position is proportional to the rate of flow, it is immediately clear that the velocity of rotation of the measuring wheel must be a linear function of the rate of flow.

These considerations hold for low pressure conditions. So that they maintain their accuracy for all service pressures, care must be taken that the exit velocity remains the same for all service pressures. Since, however, this exit velocity depends on the ratio of the pressure drop and the specific gravity of the gas, and hence on the variability of this ratio, this ratio must be made invariable. This is simply effected in the further development of the invention by causing the loading of the system movable with the control membranes, and hence the pressure drop at the measuring cross-section to be given a variability which is linear to the specific gravity of the gas.

In the embodiment according to Figs. 1 and 2, at least one auxiliary membrane 32 is provided for this purpose, one side of which is subject to the service pressure in the housing and the other side to atmospheric pressure. The setting force of the membrane or membranes 32 is transmitted by a rod or rods 33 to a lever or levers 35 pivotally mounted at 34 and through a rod or rods 36 to the pivot lever or levers 22.

The variability of the barometric reading plays no part with higher service pressures. In the low pressure region, however, as in town gas supply systems, for example, the influence of the barometric reading on the volumetric indication is greater. In such cases, consideration of the barometric reading can be effected simply by using one or more barometer capsules 32a instead of the auxiliary membrane or membranes 32 acting as manometers as shown in Figure 3. The loading of the system movable with the membrane or membranes 18, 30 is then a function of the barometric reading and compensates its variability. Barometer capsule 32a or capsules can obviously be provided inside the housing 1, so that the absolute pressure (i. e., the sum of the service gauge pressure and the barometric pressure) is then being considered as is shown in Figure 4.

Fig. 3 shows an embodiment of the invention in connection with a meter of the above-mentioned second constructional type. Insofar as the arrangement corresponds to that of Figs. 1 and 2, the parts are provided with the same references.

A vessel 37 is located in the housing 1 and is suspended from a base plate 39 mounted in sealing relation at 38 upon the housing wall 1. The upper opening of the vessel 37 is closed by a membrane 18, whose central region is stiffened by a plate 40. The plate 40 is provided with a shaft 41 which is guided for reciprocatory movement at 42 and 43.

The movement of the plate 40 is transmitted by rods 44 by way of a crank 45 to pivotal guiding flow guide members 46. These guiding flow guide members, as illustrated in Fig. 4 on an enlarged scale in side view, are each mounted in a draught trap 47, which is installed by means of a flange 48 located in a suitable opening in the plate 39. A number of such traps 47 with guiding flow guide members 46 pivotally mounted therein are arranged in a circle in about the center of the plate 39. The latter carries the point bearing 4 of the shaft 9 of the wheel 6, whose radially directed blades 14 lie above the openings of the traps 47. The measuring wheel 6 is surrounded over the full height of the blades by a cylinder 49 serving as a flow guide.

On the side of the inlet pipe 3, the gas entry into the housing 1 is located beneath the plate 39 and at the side of the outlet pipe 31 the outlet of the housing 1 is mounted above the plate 39. A connecting pipe 50 connects the outlet pressure to the vessel 37, so that the pressure drop across the orifices representing the measuring cross-section is effective on the membrane 18 and hence on the whole of the system movable with it.

The weight of the system movable with the membrane 18 and the reciprocal drive operate in the same sense. There is, therefore, no resetting force opposing the downward drive, and determining the balanced state of the membrane 18. Such a resetting force must consequently be provided. This is done by over-compensating the weight of the system which is movable with the control membrane 18, by means of a counter-weight arranged on a two-armed lever, the desired resetting force being delivered by the surplus.

This feature is shown in the lower part of Figure 5. A rod 52 is connected at 51 to the shaft 41, and, in turn, engages at 53 a two-armed lever 54, 55, which is pivotally mounted at 56. The arm 55 of this lever has the form of a sector and produces the equalizing and resetting force for the system which is movable with the control membrane 18.

In the embodiment of Figs. 1 and 2, the exit velocity at the orifice representing the measuring cross-section was held constant in size and direction, so that the requirement stated at the beginning, that the tangent of the incidence angle must be proportional to the rate of flow, was directly fulfilled by the corresponding twisting of the measuring wheel blades. In the arrangement according to Fig. 3, however, since the measuring wheel blades have the same incidence angle in all zones, the size of the flow velocity upon the blades must alter in accordance with the inflow direction for fulfilling this requirement, so that the rotational velocity of the measuring wheel remains proportional to the tangent of the incidence angle.

In order to enable that the system movable with the membrane 18 always adjusts the incidence angle of the guiding device, so as to fulfill this requirement, the counterweight 55 must always alter with the alteration of the rate of flow in such a manner that the velocity of flow at the measuring cross-section corresponds to the alteration of the tangent at the incidence angle.

For this purpose, the sector-shaped lever arm 55 is provided with a series of perpendicular pins 57 of various lengths. These pins 57 co-operate with a corresponding series of loading members 58, which are pivotally suspended independently of each other and independently of the lever 53 at the pivot point 56 of the latter, their free ends in the rest position resting upon a common support 59 and being successively lifted by the pins 57 on pivoting of the sector 55. Figure 7 shows, in a view taken at right angles to Fig. 3, the positions of the parts of this arrangement.

With the arrangement of Figure 5, the counting mechanism (not shown) must be assumed to be arranged outside the housing, e. g., within a housing cap 61 covered by a glass disc 60. This arrangement, which is common to other meter constructions, does not relate to the invention and is mentioned here merely for the sake of completeness.

The embodiments shown illustrate directly that the desired result is attained with the present invention by enabling a damping of any desired strength to be produced for the system movable with the control membranes, since the running of the measuring wheel is not affected by such damping in any way. They also illustrate that, for controlling the variable quantities, minimum setting forces are required, so that the meter embodying the invention only has a small pressure drop and hence gives a larger measuring range than any previously known measuring wheel meter constructions.

Finally, the embodiments show that with the present invention the measuring cross-section of the meter remains relatively small even at large throughputs, so small that considerable transverse flows, which could lead to the breakdown of the flow structure mentioned earlier, can no longer occur.

Realization of the invention is obviously not limited to the embodiments illustrated and described, but can accommodate the most varied modifications. The arrangement of the system movable with the membrane, for example, can be modified so that the flow is directed inwardly, the measuring wheel (paddle wheel, paddle roller, or the like) being arranged inside the system. This embodiment which represents the cinematic reversal of the embodiment according to Figs. 1 and 2 is shown in Fig. 8. It differs in detail from the embodiment according to Figs. 1 and 2 mainly in that the inlet pipe 3 is mounted high and the outlet pipe 31 is mounted low on the housing.

I claim:

1. In a measuring wheel meter having a rotatable impulse-type measuring wheel with blades and means defining an opening positioned for the passage of fluid therethrough positioned transversely across the blades to impinge on the blades of said measuring wheel for the rotatable actuation thereof, said opening representing the measuring cross-section of the meter, the improvement which comprises a movable control member movable in response to change in the pressure drop across said opening, means for varying the transverse angle of incidence at which fluid passing through said opening impinges on the surfaces of the blades of said measuring wheel responsive to movement of said control member, and for varying the size of said opening responsive to movement of said control member.

2. Improvement according to claim 1, in which the blades of said measuring wheel extend in a ring substantially parallel to the axis of rotation of said measuring wheel and varying in pitch along their length, and in which said control member includes a cylinder movable co-axially with the axis of rotation of said measuring wheel and defining an edge portion terminating inside said ring of blades movable substantially along the length of the blades, a cover disc positioned in spaced relationship to said edge portion to define said opening therebetween, said cover disc being movable co-axially with said cylinder, a substantially gas-tight casing surrounding said cylinder and measuring wheel defining a fluid inlet in flow communication with the interior of said cylinder and an outlet positioned for the passage of fluid therethrough after passage through said cylinder opening and ring of blades, flexible sealing means connected to said cylinder and sealing the interior of said cylinder from pressure communication with said outlet, and linkage means for varying the position of said cover disc from said edge portion upon movement of said cylinder.

3. Improvement according to claim 2, in which said flexible sealing means is in sealing engagement with the end portion of said cylinder opposite said edge portion and the adjacent inner surface of said casing.

4. Improvement according to claim 3, in which said measuring wheel is rotatable about a substantially vertical axis, and in which said cylinder is positioned below said measuring wheel, said fluid inlet below said cylinder, and said outlet above said measuring wheel.

5. Improvement according to claim 4, in which said measuring wheel is mounted for rotation on a vertical shaft bearing extending through said cylinder and cover disc, and in which said cover disc is an annular cover disc, and including a flexible sealing membrane in sealing engagement with said shaft and said cover disc.

6. Improvement according to claim 5, in which said linkage means comprises a lever linkage pivotally connected to said shaft.

7. Improvement according to claim 6, including a movable pressure sensitive member having one side thereof in pressure communication with the outside of said casing and the other side thereof in pressure communication with the interior of said cylinder, and linkage means connecting said cylinder and pressure sensitive member for axial movement of said cylinder upon movement of said pressure sensitive member.

8. Improvement according to claim 1, including pressure sensitive means responsive to change in specific gravity of fluid passing through the meter for exerting force on said control member in its directions of movement upon change of the specific gravity of fluid passing through the meter.

9. Improvement according to claim 1, including pressure sensitive means positioned for exerting force on said control member in its directions of movement upon change of the barometric pressure.

10. Improvement according to claim 1, in which said means for varying the angle of impingement is means for varying the angular direction of fluid passing through said opening and the size of said opening.

11. Improvement according to claim 10, in which said opening is defined by at least one draught trap having a pivotable guide member, and in which said control member includes a movable pressure sensitive member having one side thereof in pressure communication with one side of said opening and the other side thereof in pressure communication with the other side of said opening, and means for pivotally moving said guide member upon movement of said pressure sensitive member.

12. Improvement according to claim 11, in which said last mentioned means comprises lever means.

13. Improvement according to claim 11, including means for exerting an increasing force on said pressure sensitive member in a direction to decrease the size of said opening upon movement of said pressure sensitive member in the opposite direction.

14. Improvement according to claim 13, in which said last mentioned means comprise weighted lever means.

15. Improvement according to claim 1, in which said measuring wheel and control member are positioned in a substantially gas-tight housing having a horizontal partition and defining a gas inlet below said partition and a gas outlet above said partition, said measuring wheel being rotatably positioned on a substantially vertical axis above said partition, said opening being defined by a ring of a multiple number of draught traps extending through said partition, said draught traps having pivotally mounted guide members for varying upon pivoting the size and the angular direction of the opening defined therethrough, said control member comprising a substantially pressure-tight container having a movable wall portion, a substantially gas-tight conduit pressure communicating the interior of said container with the portion of said casing above said partition, linkage means connecting said pivotable guide means with said movable wall portion of said container for pivoting actuation of said guide members in a direction decreasing the size of said opening upon movement of said wall portion away from the interior of said container and in a direction increasing the size of said opening upon movement of said wall portion in a direction toward the interior of said container, and means urging said movable wall portion in a direction away from the interior of said container to a predetermined position.

16. Improvement according to claim 15, in which said last mentioned means include a two-armed pivotally mounted loading lever having one arm thereof formed as a sector, a multiple number of projections of various lengths extending from said sector and at least one pivotally mounted weight for contact and lifting actuation by each said projection upon pivoting of said loading lever and sector.

References Cited in the file of this patent

UNITED STATES PATENTS

| | | |
|---|---|---|
| 166,175 | Winzer et al. | July 27, 1875 |
| 200,676 | Walsh | Feb. 26, 1878 |
| 1,804,036 | Stevenson | May 5, 1931 |
| 2,100,495 | Stevenson | Nov. 30, 1937 |

FOREIGN PATENTS

| | | |
|---|---|---|
| 503,748 | Great Britain | Apr. 13, 1939 |